United States Patent
Merker

(10) Patent No.: US 6,408,194 B1
(45) Date of Patent: *Jun. 18, 2002

(54) METHOD OF DETECTING OPERATING STATES OF AN ELECTRICAL APPARATUS AND ELECTRICAL APPARATUS FOR DETECTING APPARATUS-SPECIFIC OPERATING STATES

(75) Inventor: Andreas Merker, Horstmar (DE)

(73) Assignee: Siemens Aktiengesellschaft

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,023

(22) PCT Filed: Dec. 6, 1996

(86) PCT No.: PCT/DE96/02340

§ 371 (c)(1),
(2), (4) Date: Jun. 5, 1998

(87) PCT Pub. No.: WO97/21298

PCT Pub. Date: Jun. 12, 1997

(51) Int. Cl.[7] .................................................. H04B 1/38
(52) U.S. Cl. .................... 455/573; 455/552; 455/561
(58) Field of Search ................................. 455/568, 569, 455/572, 573, 561, 552, 553

(56) References Cited

U.S. PATENT DOCUMENTS 5,035,632 A * 7/1991 Metroka et al. ............ 455/566

(List continued on next page.)

FOREIGN PATENT DOCUMENTS

| EP | 0 279 233 | 8/1988 |
| EP | 0 313 776 | 5/1989 |
| EP | 0 514 072 | 11/1992 |
| EP | 0 624 021 | 11/1994 |
| WO | 92/00640 | 1/1992 |

OTHER PUBLICATIONS

Koch, "Digitaler Komfort für schnurlose Telekommunikation", Telcom Report 16, 1993, Heft, pp. 26 & 27.

S. Althammer et al., "Hochoptimierte ICs für DECT–Schnurlostelefone", Components 31, (1993), Heft 6, pp. 215–218.

A. Mann, Der GSM–Standard Grundlage für digitale europäische Mobilfunknetze, Informatik Spektrum (1991), pp. 137–152.

Mudler, DECT, a universal cordless access system, Philips Telecommunication Review, vol. 49, 1991, pp. 68–73.

Pilger, Struktur des DECT–Standards, Nachrichtentchnik Elektronik 42, (1992), No. 1, pp. 23–29.

European Telecommunication Standard–Final Draft–pr ETS 300 444–Apr. 1995, pp. 1–129.

*Primary Examiner*—Vivian Chin
*Assistant Examiner*—Charles N. Appiah
(74) *Attorney, Agent, or Firm*—Bell, Boyd & Lloyd LLC

(57) ABSTRACT

A cordless mobile part and method that detects selection features for a number operating modes. The mobile part also controls functional sequences specific to the mobile part and identifies the operating modes specific to the mobile part, the operating modes include a first operating mode for operating on a convenience charging station; a second operating mode for operating on a standard charging station; a third operating mode for operating on a headset fourth operating mode for operating as a handset. A controller connected to the detection system is designed in such a manner that interrogation is performed at all the branch points in each decision level on the basis of a selection feature in accordance with a decision tree having a plurality of decision levels and level-immanent branch points.

8 Claims, 14 Drawing Sheets

U.S. PATENT DOCUMENTS

| | | | |
|---|---|---|---|
| 5,164,652 A | * 11/1992 | Johnson et al. | 320/2 |
| 5,379,338 A | 1/1995 | Umemoto et al. | |
| 5,636,265 A | * 6/1997 | O'Connell et al. | 455/412 |
| 5,745,859 A | * 4/1998 | Takenaka | 455/568 |
| 5,758,267 A | * 5/1998 | Pinder et al. | 455/90 |
| 5,794,163 A | * 8/1998 | Paterson et al. | 455/568 |
| 5,857,151 A | * 1/1999 | Heinonen | 455/349 |
| 5,925,942 A | * 7/1999 | Theobald | 307/125 |
| 6,021,332 A | * 2/2000 | Alberth, Jr. et al. | 455/552 |
| 6,097,973 A | * 8/2000 | Rabe et al. | 455/572 |
| 6,339,642 B1 | * 1/2002 | Ota et al. | 379/406.01 |

* cited by examiner

No call; activation via "hands-free speech" key in the convenience charging station Hands-free speech active;
end call via
"hands-free speech"
key in the convenience
charging station Hands-free speech active;
end call via "call"
key in the mobile part Change from hands-free
speech operation
to handset operation

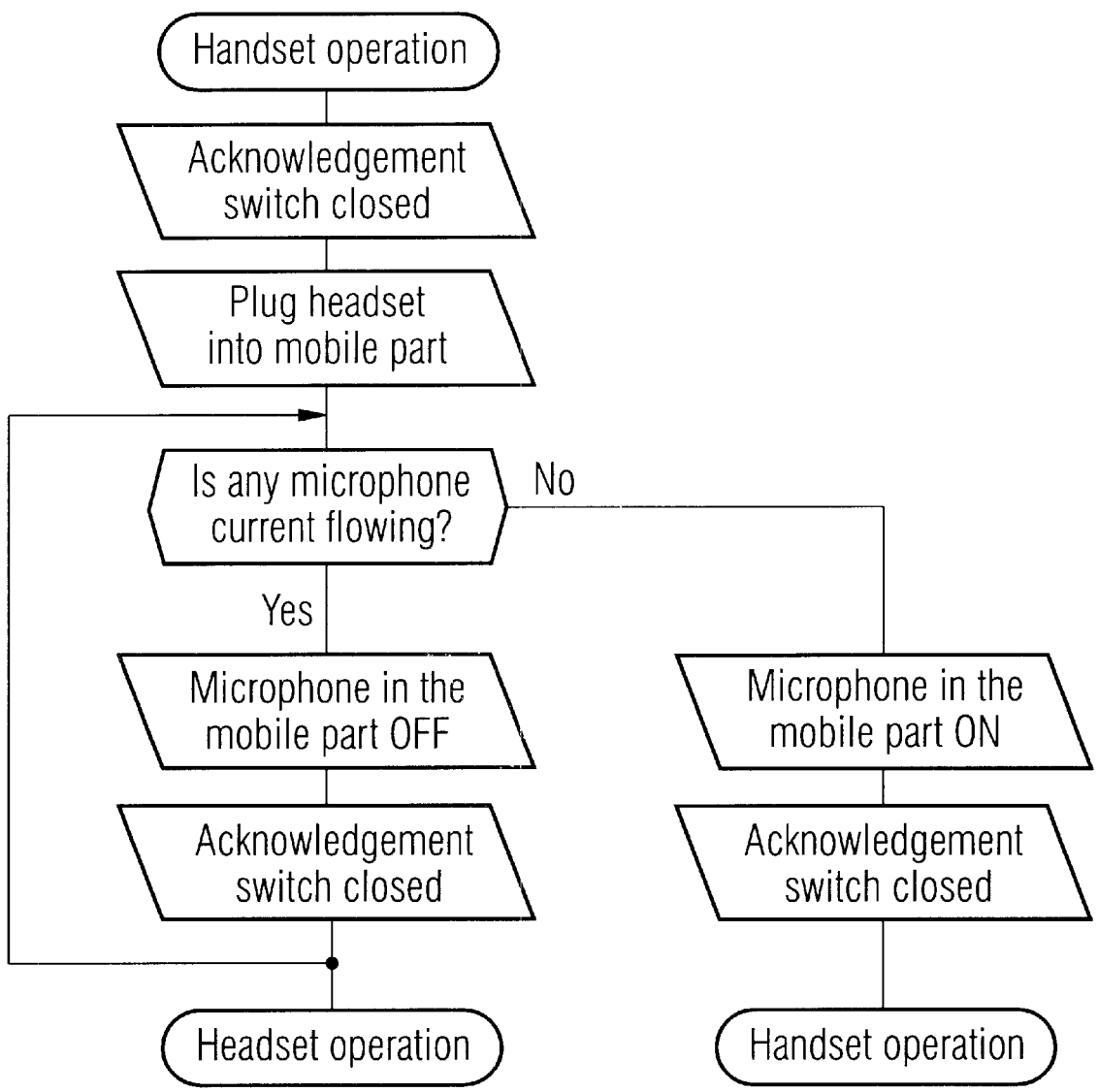

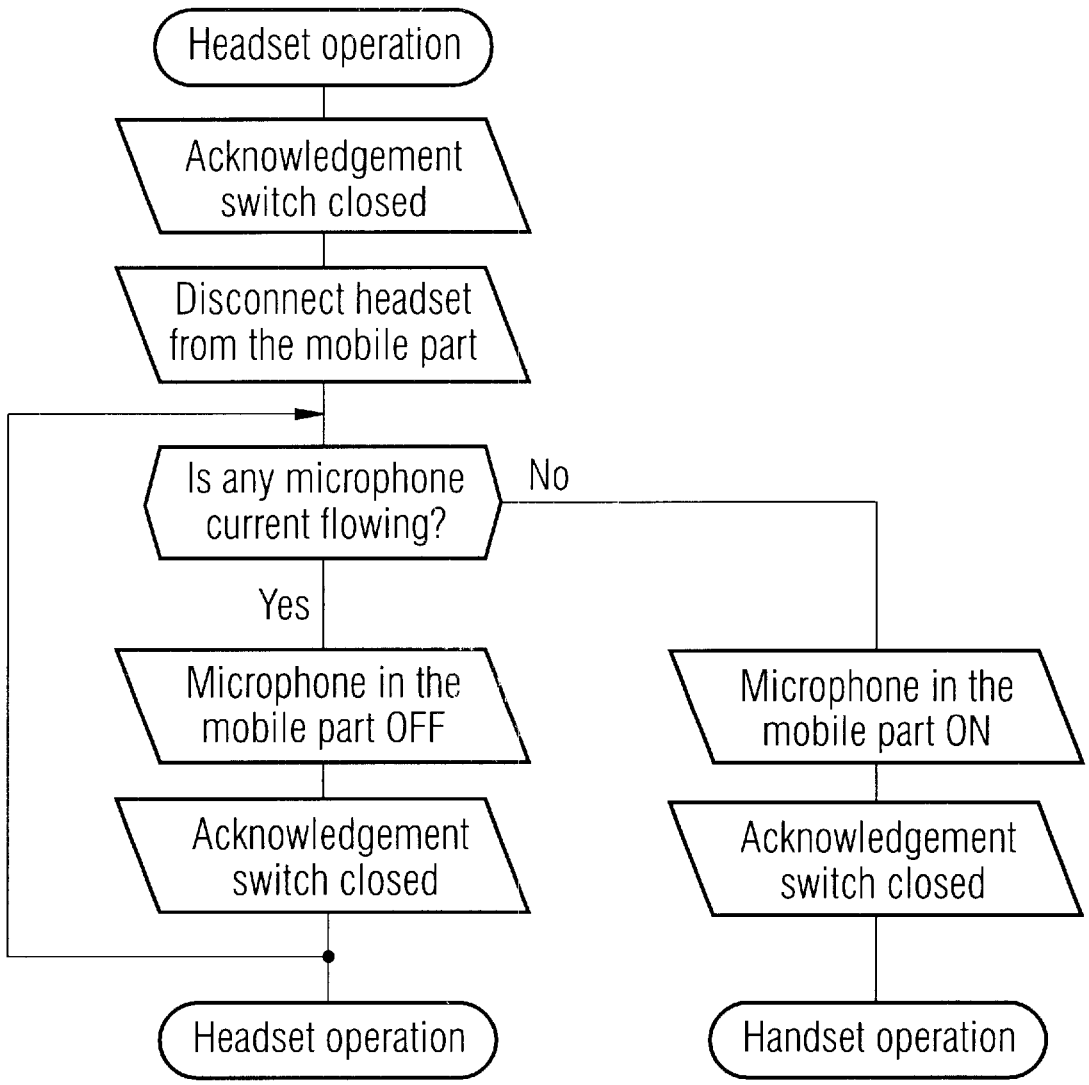

METHOD OF DETECTING OPERATING STATES OF AN ELECTRICAL APPARATUS AND ELECTRICAL APPARATUS FOR DETECTING APPARATUS-SPECIFIC OPERATING STATES

BACKGROUND OF THE INVENTION

1. Field of the Invention

The invention relates to a method for identifying various operating modes of an electrical apparatus specific to the telecommunication field.

2. Description of the Related Art

Electrical apparatuses which may assume different operating modes from an original mode include, for example, mobile telecommunication equipment. Telecommunication equipment may be designed as cordless mobile parts in accordance with the DECT/GAP Standard (Digital European Cordless Telecommunication; see (1): Nachrichtentechnik Elektronik [Telecommunications Electronics] 42 (1992, January/February), No. 1, Berlin, DE; U. Pilger: "Struktur des DECT-Standards" [Structure of DECT Standard], pages 23 to 29; (2): Philips Telecommunication Review, Vol. 49, No. 3, September 1991; R. Mulder: "DECT Universal Cordless Access System", pages 68 to 73;/Generic Access Profile; see ETSI-Publication prETS 300444, April 1995, Final Draft, ETSI, FR) or as mobile radio mobile parts in accordance with the GSM Standard (Groupe Spéciale Mobile oder Global System for Mobile Communication; see Informatik Spektrum [Information Technology Spectrum] 14 (1991) June, No. 3, Berlin, DE; A. Mann: "Der GSM-Standard—Grundlage für digitale europäische Mobilfunknetze" [The GSM Standard—Basis of digital European mobile (radio networks], pages 137 to 152). The various operating modes of the mobile telecommunication equipment are designed from standard features that are specific to the telecommunications apparatus and/or from performance features which are specific to the telecommunications apparatus.

One standard feature that is specific to the telecommunication equipment is the charging of the energy storage (for example a rechargeable battery) used in the telecommunication equipment. One performance feature that is specific to the telecommunication equipment is the "hands-free speech" and the "loudspeaker/hands-free listening".

Reference EP-0 313 776 B1 discloses a mobile telecommunications apparatus (cordless mobile part) which, with a charging shell, forms a (temporary) functional unit in such a manner that both the "battery recharging" standard feature and the "hands-free speech" and/or "loudspeaker" performance feature can be activated.

Furthermore, Reference EP-0-624 021 A2 and WO 92/00640 disclose mobile telecommunication equipment (cordless mobile parts and mobile radio handsets) which can be used to achieve the performance feature "hands-free speech". To this extent, the mobile telecommunication equipment has an earpiece which is designed as an earphone or headset and is connected (detachably) via a cord to the handset of the telecommunication equipment. The other telecommunication-specific parts are arranged and/or contained in the handset. In order to achieve the performance feature "hands-free speech", it is possible—according to EP-0 624 021 A2—for the handset to be mounted with the microphone and/or—according to WO 92/00640—an external microphone to be attached to the earpiece cord in the vicinity of the mouth (for example a jacket or shirt pocket), and for the earpiece to be inserted into the ear.

On the basis of the configurations of a mobile telecommunication equipment described above, a distinction is drawn between standard mobile parts and convenience mobile parts.

While standard mobile parts have only the standard feature "battery recharging", both the standard feature "battery recharging" and the performance feature "hands-free speech" and/or "loudspeaker/hands-free listening" can be implemented in convenience mobile parts.

Examples of known circuit designs related to the invention are shown in FIGS. 1, 2 and 3 herein and further explained in an article published in Components 31 (1993), Issue 6, pages 215 to 218; S. Althammer, D. Brückmann, entitled "Hoch-optimierte IC's für DECT-Schnurlostelefone" [Highly optimized ICs for DECT cordless telephones], (hereinafter "Components 31 Article"). FIG. 1 shows the basic circuit design of a standard mobile part S-MT which is used in the Siemens cordless telephone "Gigaset 951/952" (see telcom report 16 (1993), Issue 1, pages 26 and 27) and forms a (temporary) functional unit with a standard charging station S-LST for charging the energy storage (for example a rechargeable battery) which is used in the standard mobile part S-MT.

In FIG. 1, the circuit design consists of a first radio part S-FKT connected to a first signal processing device S-SVE. The first signal processing device includes a first signal control part S-SST designed as a burst mode controller S-BMC, and a first signal conversion part S-SUT designed as a CODEC and AD/DA converter. A first clock generator S-TG is connected to a first microcontroller S-μC designed as a central controller S-ZS. A first BOF interface S-BSS for a first operator interface S-BOF. The operator interface consists of a first keypad S-TA, a first display device S-AE, a first earpiece S-HK, a first microphone S-MF and a first bell S-TRK. A first power supply S-SV is connected to a first connection interface S-ASS for the standard charging station S-LST. The method of operation of the circuit design in FIG. 1 is further described in the Components 31 Article cited above.

Based on reference EP-0 313 776 B1 and on the above referenced Components 31 Article, FIG. 2 shows the principle of the circuit design of a convenience mobile part K-MT, which forms a (temporary) functional unit with a convenience charging station K-LST for charging the energy storage (for example a rechargeable battery) which is used in the convenience mobile part S-MT, and for providing the performance feature "hands-free speech" and "loudspeaker".

In FIG. 2, the circuit design incorporates a second radio part K-FKT and a second signal processing device K-SVE. The signal processing device K-SVE includes a second signal control part K-SST designed as a burst mode controller K-BMC and a second signal conversion part K-SUT designed as a CODEC and AD/DA converter. A second clock generator K-TG is connected to a second microcontroller K-μC designed as a central controller K-ZS. The microcontroller K-μC also includes an analog/digital converter ADW. A second BOF interface K-BSS for a second operator interface K-BOF having a second keypad K-TA connected to the BOF interface. The second operator interface also has a second display device K-AE connected to an output of the BOF interface. The second operator interface K-BOF also has a second earpiece K-HK and a second bell K-TRK, each connected to an output of the BOF interface. A second microphone K-MF of the operator interface K-BOF is connected to a input of the BOF interface. A second power supply K-SV is connected to a second connection interface K-ASS for the convenience charging station K-LST. The principle of the method of operation of the circuit design is described in the Components 31 Article cited above.

As further described in references EP-0 624 021 A2 and WO 92/00640 and in conjunction with the Components 31 Article, FIG. 3 shows the principle of the circuit design of the convenience mobile part K-MT according to FIG. 2 and further provides the performance feature "hands-free speech" and "hands-free listening". In FIG. 3, the connection interface K-ASS is connected, preferably detachably, to a headset KSG with a headset microphone KSMF and a headset earpiece KHK.

The circuit design in FIG. 3 shows the radio part K-FKT, the signal processing device K-SVE with the signal control part K-SST designed as a burst mode controller K-BMC, and the signal conversion part K-SUT designed as a CODEC and AD/DA converter, the clock generator K-TG, the microcontroller K-$\mu$C designed as a central controller K-ZS and having an analog/digital converter ADW, the BOF interface K-BSS for the operator interface K-BOF having the keypad K-TA, the display device K-AE, the earpiece K-HK, the microphone K-MF and the bell K-TRK, the power supply K-SV and the connection interface K-ASS for the headset KSG are connected in a similar manner as described in FIG. 2 above. An example of the method of operation of the circuit design is described in the Components 31 Article cited above.

There are thus four possible operating modes for the convenience mobile part K-MT: (1) hands-free speech/loudspeaker operation in conjunction with the convenience charging station K-LST and operation on the convenience charging station K-LST (first operating mode); (2) operation on the standard charging station S-LST (second operating mode); (3) hands-free speech/hands-free listening operation with the headset KSG (third operating mode); and (4) normal/conventional handset operation (fourth operating mode).

SUMMARY OF THE INVENTION

In accordance with the teachings of the present invention, an object of the invention is for an electrical apparatus to identify a number of different operating modes of the electrical apparatus quickly, easily and reliably.

This object is achieved on the basis of a method for identifying operating modes of an electrical apparatus having an original mode in which the electrical apparatus establishes a first number "n" equal to the number of operating modes where "n is greater or equal to 4" from the original mode, interrogation is performed at all the branch points to determine the selection feature of the corresponding operating modes in accordance with a decision tree. The decision tree includes a number of decision levels and level-immanent branch points, interrogation is performed at all the branch points, in each decision level, on the basis of the same selection feature; and this object is also achieved in an electrical apparatus that has an original mode and assumes a number "n" of a number of operating modes where n≧4 from the original mode, the apparatus includes a means for detecting selection features for the plurality of operating modes; and means for controlling apparatus-specific functional sequences wherein the functional sequences are designed in such a manner that interrogation is performed at all level-immanent branch points in each of a number of decision levels of a decision tree on the basis of a selection feature.

In an embodiment, a number "n" of electrical apparatus operating states, where "n≧4", the electrical apparatus is able to identify the apparatus-specific operating modes by interrogating on the basis of a selection feature at all the branch points in a decision level of a decision tree having a plurality of decision levels and level-immanent branch points.

In an alternative embodiment, cordless mobile part that detects the selection features of the operating modes and controls the functional sequences which are specific to the mobile part, identifies the operating modes which are specific to the mobile part quickly, easily and reliably. A first operating mode entitled "Operation on a convenience charging station", a second operating mode entitled "Operation on a standard charging station", a third operating mode entitled "Operation on a headset" and a fourth operating mode entitled "Operation as a handset" are connected to the detection means and are designed in such a manner that interrogation is in each case carried out on the basis of the same selection feature at all the branch points in each decision level, in accordance with the decision tree having the decision levels and the level-immanent branch points.

In another embodiment, the cordless mobile part results in a high degree of compatibility between the convenience mobile parts, standard mobile parts, standard charging stations and convenience charging stations.

Additional features and advantages of the present invention are described in, and will be apparent from, the detailed description of the presently preferred embodiments and from the drawings.

BRIEF DESCRIPTION OF THE DRAWINGS

FIG. 15 shows a flow chart for an alternative embodiment of a convenience mobile telecommunication system.

FIG. 16 shows a flow chart for an alternative embodiment of a convenience mobile telecommunication system.

FIG. 4 shows a first operating mode BZ1 of the convenience mobile part K-MT according to FIG. 2, in which the second connection interface K-ASS of the convenience mobile part K-MT is connected to the convenience charging station K-LST according to FIG. 2. The first operating mode BZ1 is characterized by two partial operating modes, which represent the standard feature "battery recharging" and the performance feature "hands-free speech and loudspeaker", a first partial operating mode "battery recharging" and a second partial operating mode "hands-free speech and loudspeaker".

Figure 2:
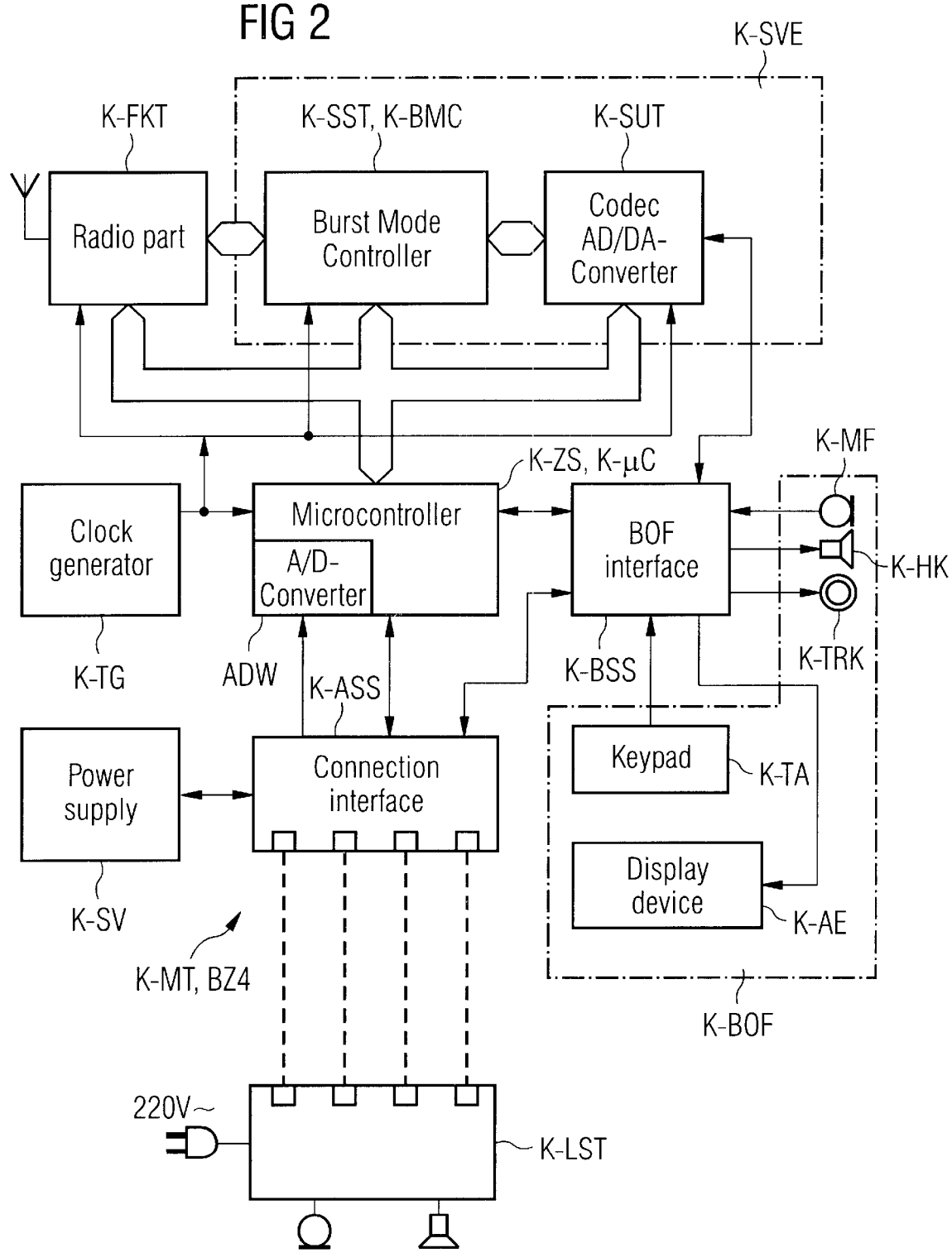
FIG. 2 shows a circuit diagram of a convenience mobile telecommunications system.

The connection between the convenience mobile part K-MT and the convenience charging station K-LST for these partial operating modes is produced via
 a) four connecting contacts of the second connection interface K-ASS of the convenience mobile part K-MT according to FIG. 2 (convenience connecting contacts), a first convenience connecting contact K-AK1, a second convenience connecting contact K-AK2, a third convenience connecting contact K-AK3 and a fourth convenience connecting contact K-AK4, and
 b) four charging station contacts of the convenience charging station K-LST according to FIG. 2 (convenience charging station contacts), a first convenience charging station contact K-LK1, a second convenience charging station contact K-LK2, a third convenience charging station contact K-LK3 and a fourth convenience charging station contact K-LK4.

The convenience mobile part K-MT is charged from the convenience charging station K-LST via the charging station contacts K-LK1, K-LK2 and the connecting contacts K-AK1, K-AK2.

Signaling information items which activate the performance feature "hands-free speech" and "loudspeaker" are exchanged between the convenience charging station K-LST and the convenience mobile part K-MT via the charging station contacts K-LK1, K-LK2, K-LK3 and the connecting contacts K-AK1, K-AK2, K-AK3.

Analog voice signals are transmitted bidirectionally in the course of the activated performance feature "hands-free speech" and "loudspeaker" via the charging station contacts K-LK3, K-LK4.

In order to avoid control errors on the convenience mobile part K-MT in the partial operating modes of the first operating mode BZ1, the transmission
 a) of the charging current from the convenience charging station K-LST to the convenience mobile part K-MT,
 b) of the signaling information items from the convenience charging station K-LST to the convenience mobile part K-MT and from the convenience mobile part K-MT to the convenience charging station K-LST, and
 c) of the analog voice signals from the convenience charging station K-LST to the convenience mobile part K-MT and from the convenience mobile part K-MT to the convenience charging station K-LST must be controlled. This is done in the convenience mobile part K-MT by the central controller K-ZS, K-$\mu$C in conjunction with two switching elements SE1 SE2. The first switching element SE1 is designed as a charging switch. The second switching element SE2 is designed as an acknowledgement switch. When the convenience mobile part K-MT is in the original mode both switching elements SE1, SE2 are closed. This original mode of the convenience mobile part K-MT also applies to FIG. 5 and FIG. 6 described below.

Standard Feature "Battery Recharging" (first partial operating mode)

In order to recharge the rechargeable battery K-SV according to FIG. 2, the convenience charging station K-LST has a plug connection K-SA that is connected to an AC power supply (for example 220 V AC). An input of a main voltage transformer K-NST is connected to the plug connection K-SA. An output of the main voltage transformer K-NST is connected to a third switching element SE3. The third switching element SE3 is designed as a series regulator. These components are connected to the first charging station contact K-LK1 and produce a charging current LS. The charging current LS flows through a bridge rectifier BGR in the connection interface K-ASS of the convenience mobile part K-MT. After this, the charging current LS passes via the closed charging switch SE1 to the rechargeable battery K-SV. A closed charging circuit is produced by the common ground connection between the convenience mobile part K-MT and the convenience charging station K-LST via the second connecting contact K-AK2 and the second charging station contact K-LK2.

Performance Feature "Hands-free Speech" and "Loudspeaker" (second partial operating mode)

The implementation of the performance feature "hands-free speech" and "loudspeaker" is composed of two phases: (1) a preparation phase; and (2) an activation phase.

During the preparation phase, a first signaling information item SI1 in the form of a first signaling current is transmitted via the first charging station contact K-LK1 and the connecting contact K-AK1 to the convenience mobile part K-MT. The signaling information item SI1 is initiated in the convenience charging station K-LST by manual operation of a momentary-contact switch TA and is produced by a pulse generator PG which is connected to the series regulator SE3. In order to transmit the signaling information item SI1, the pulse generator PG briefly interrupts the transmission path for the charging current LS and at the same time connects the transmission path for the signaling information item SI1 to the charging station contact K-LK1. The signaling information item SI1 which is transmitted to the convenience mobile part K-MT is detected in an identification circuit EKS which has a switch-mode regulator (not shown), and is passed on to the central controller K-ZS. The closed circuit for the first signaling current is achieved by the common ground connection between the convenience mobile part K-MT and the convenience charging station K-LST via the second connecting contact K-AK2 and the second charging station contact K-LK2.

In an activation phase, which follows the preparation phase, the central controller K-ZS ensures that the charging switch SE1 is opened, and that the acknowledgement switch SE2 is closed at the same time. By closing the acknowledgement switch SE2, a second signaling information item SI2 is fed via the third connecting contact K-AK3 and a third charging station contact K-LK3 to a hands-free speech/loudspeaker circuit FLS in the convenience charging station K-LST. The second signaling information item SI2 is used as an acknowledgement information item for the first signaling information item SI1 and is in the form of a second signaling current. On receiving this signaling information item SI2, the hands-free speech/loudspeaker circuit FLS switches on a hands-free speech microphone FMF and a loudspeaker LSP.

After this, the central controller K-ZS checks via the analog/digital converter ADW whether any microphone current MFS is flowing as a consequence of the hands-free speech microphone FMF having been switched on.

If the microphone current MFS is flowing, then
- a) the microphone K-MF and the earpiece K-HK in the convenience mobile part K-MT are switched off by the central controller K-ZS, K-μC and
- b) the acknowledgement switch SE2 remains closed.

Otherwise,
- a) the microphone K-MF and the earpiece K-HK in the convenience mobile part K-MT remain switched on and
- b) the acknowledgement switch SE2 is opened.

If the microphone current MFS is flowing, then the performance feature "hands-free speech" and "loudspeaker" is activated, and the analog voice signals can be transmitted bidirectionally between the hands-free speech microphone FMF and the BOF interface K-BSS according to FIG. 2, as well as the BOF interface K-BSS and the loudspeaker LSP via the charging station contacts K-LK3, K-LK4 and the connecting contacts K-AK3, K-AK4.

The closed circuit for the second signaling current, the microphone current MFS and the analog voice signals is once again achieved by the common ground connection between the convenience mobile part K-MT and the convenience charging station K-LST via the second connecting contact K-AK2 and the second charging station contact K-LK2.

The performance feature "hands-free speech" and "loudspeaker" is preferably activated in the manner described above by the convenience mobile part K-MT via the acknowledgement switch SE2 and the central controller K-ZS, K-μC. To this extent, the preferred deactivation occurs by the convenience mobile part K-MT via the acknowledgement switch SE2 and the central controller K-ZS, K-μC. Upon deactivation of the performance feature, the charging switch SE1 is preferably reset—for a subsequent charging process—again to its closed original position. The activation and deactivation of the performance feature by the convenience mobile part K-MT has the advantage that there is no risk of the hands-free speech/loudspeaker circuit FSL being activated inadvertently in the event of any bounce of the mobile part occurring when said mobile part is inserted into the convenience charging station K-LST, which is designed as a charging shell.

The above statements, which relate to a convenience mobile part K-MT having the performance feature "hands-free speech" and "loudspeaker", can also be extended to convenience mobile parts K-MT having the performance feature "hands-free speech" and/or "loudspeaker", taking account of the performance-feature-specific changes linked to this.

Figure 1:
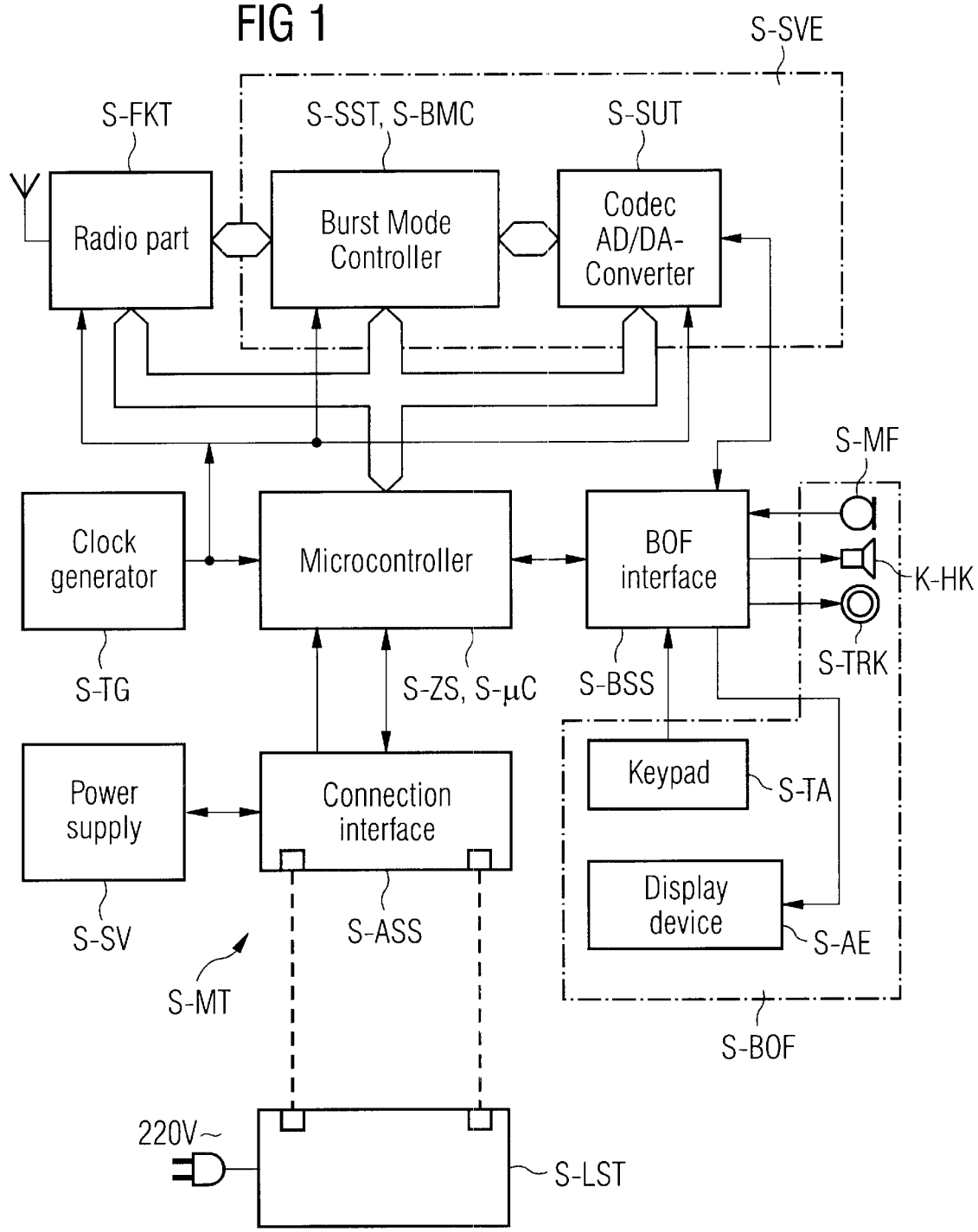
FIG. 1 shows a circuit diagram of a standard mobile telecommunications system.
Figure 4:
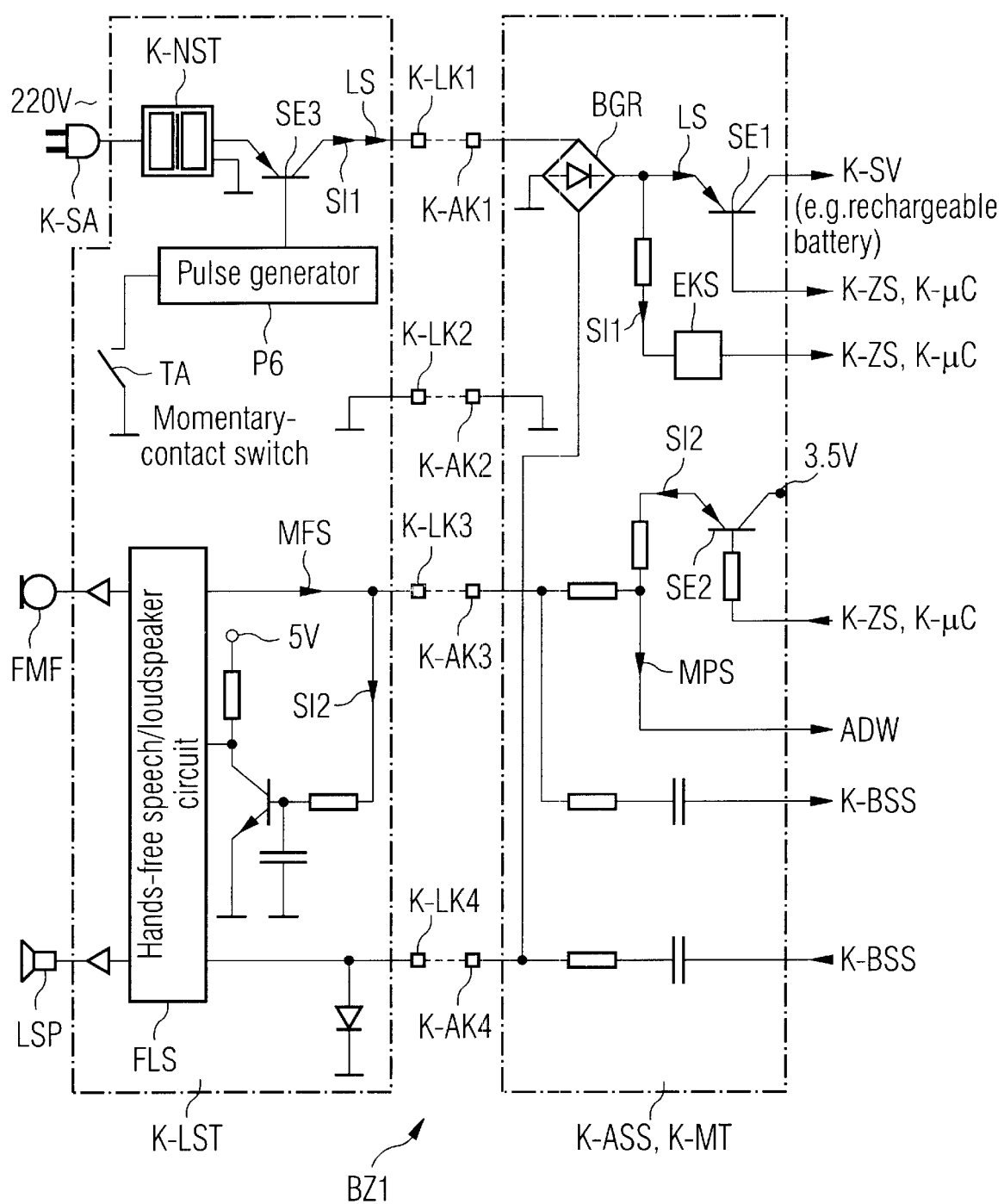
FIG. 4 shows a circuit diagram for the operation of a convenience mobile part on a convenience charging station (first operating mode)
Figure 5:
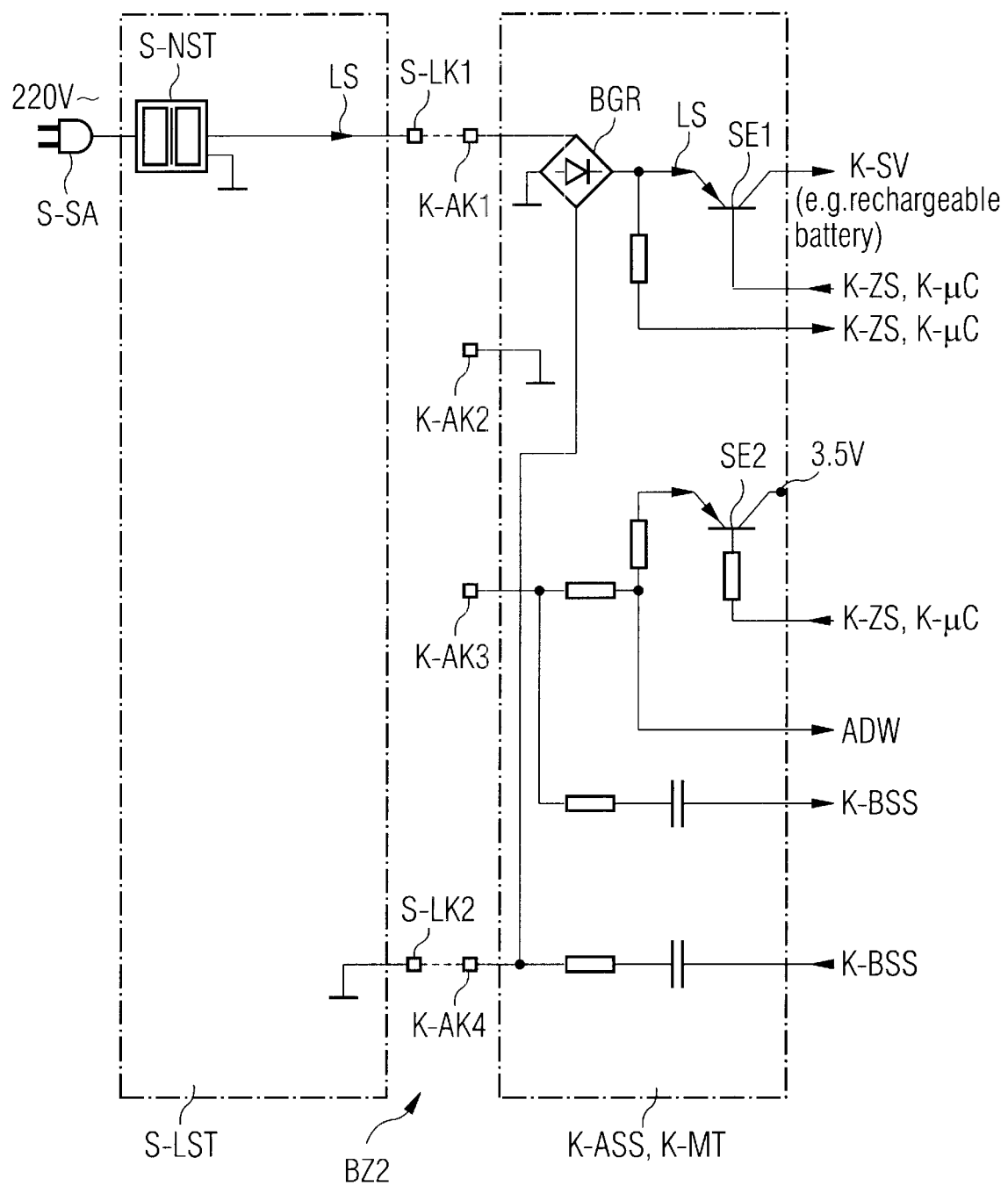
FIG. 5 shows a circuit diagram for the operation of a convenience mobile part on a standard charging station (second operating mode)
Figure 6:
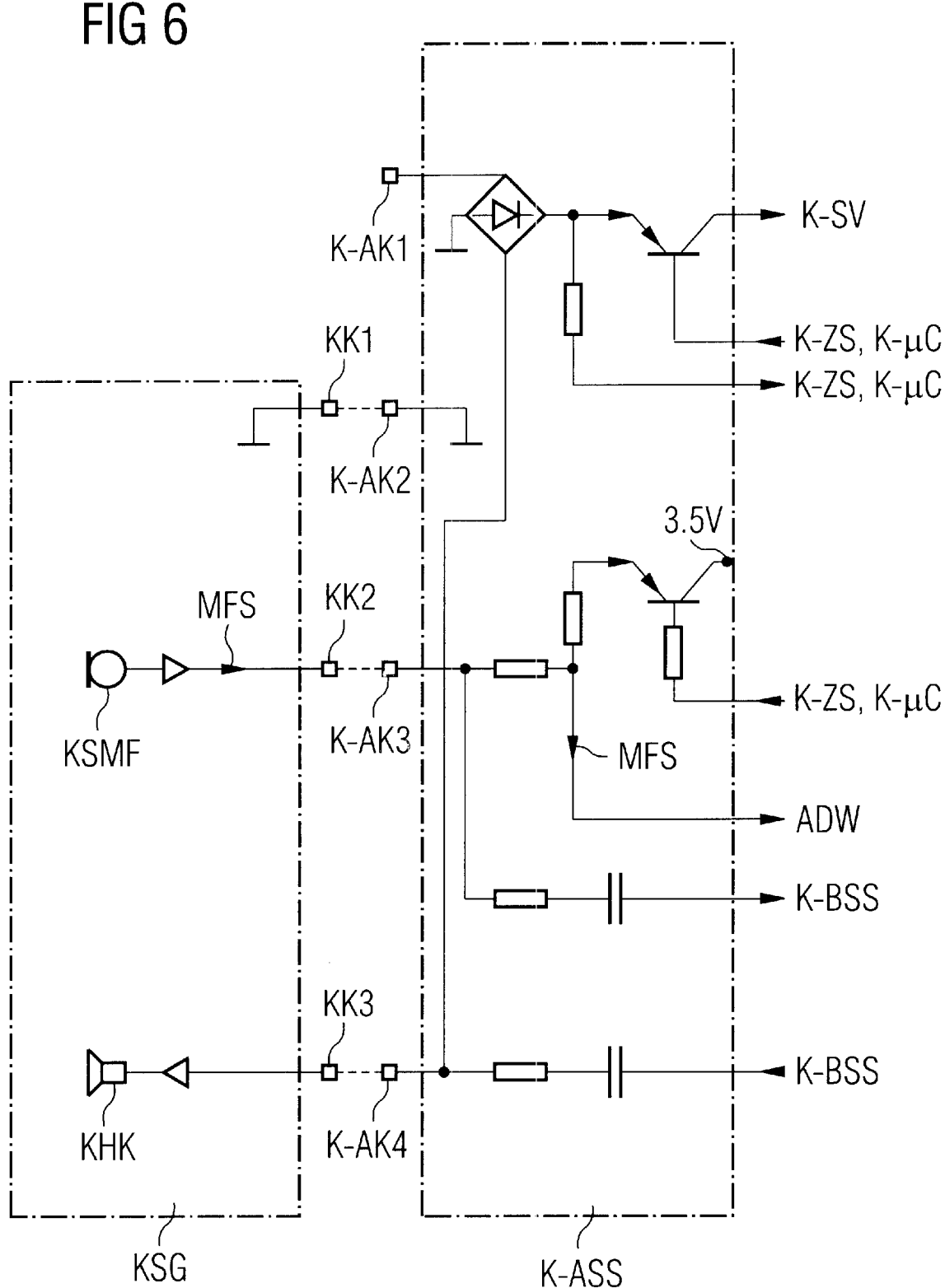
FIG. 6 shows a circuit diagram for the operation of a convenience mobile part on a headset (third operating mode)

FIG. 5 shows a second operating mode BZ2 of the convenience mobile part K-MT according to FIG. 2, in which the second connection interface K-ASS of the convenience mobile part K-MT is connected to the standard charging station S-LST according to FIG. 1. In the second operating mode BZ2, only the standard feature is supported, with the second connection interface K-ASS according to FIG. 4, by the convenience mobile part K-MT which is designed for the standard feature "battery recharging" and the performance feature "hands-free speech" and "loudspeaker".

The connection between the convenience mobile part K-MT and the standard charging station S-LST is in this case produced via

- a) the first connecting contact K-AK1 and the fourth connecting contact K-AK4 of the four convenience connecting contacts of the second connection interface K-ASS of the convenience mobile part K-MT according to FIG. 4, and
- b) two charging station contacts of the standard charging station S-LST according to FIG. 1 (standard charging station contacts), a first standard charging contact S-LK1 and a second standard charging station contact S-LK2.

The second connecting contact K-AK2 and the third connecting contact K-AK3 remain unused for the connection between the convenience mobile part K-MT and the standard charging station S-LST. This means that the first switching element SE1, which is designed as a charging switch, is permanently closed in the second operating mode BZ2, and the second switching element SE1, which is designed as an acknowledgement switch, is permanently closed in the second operating mode BZ2—thus, in the original mode.

Figure 3:
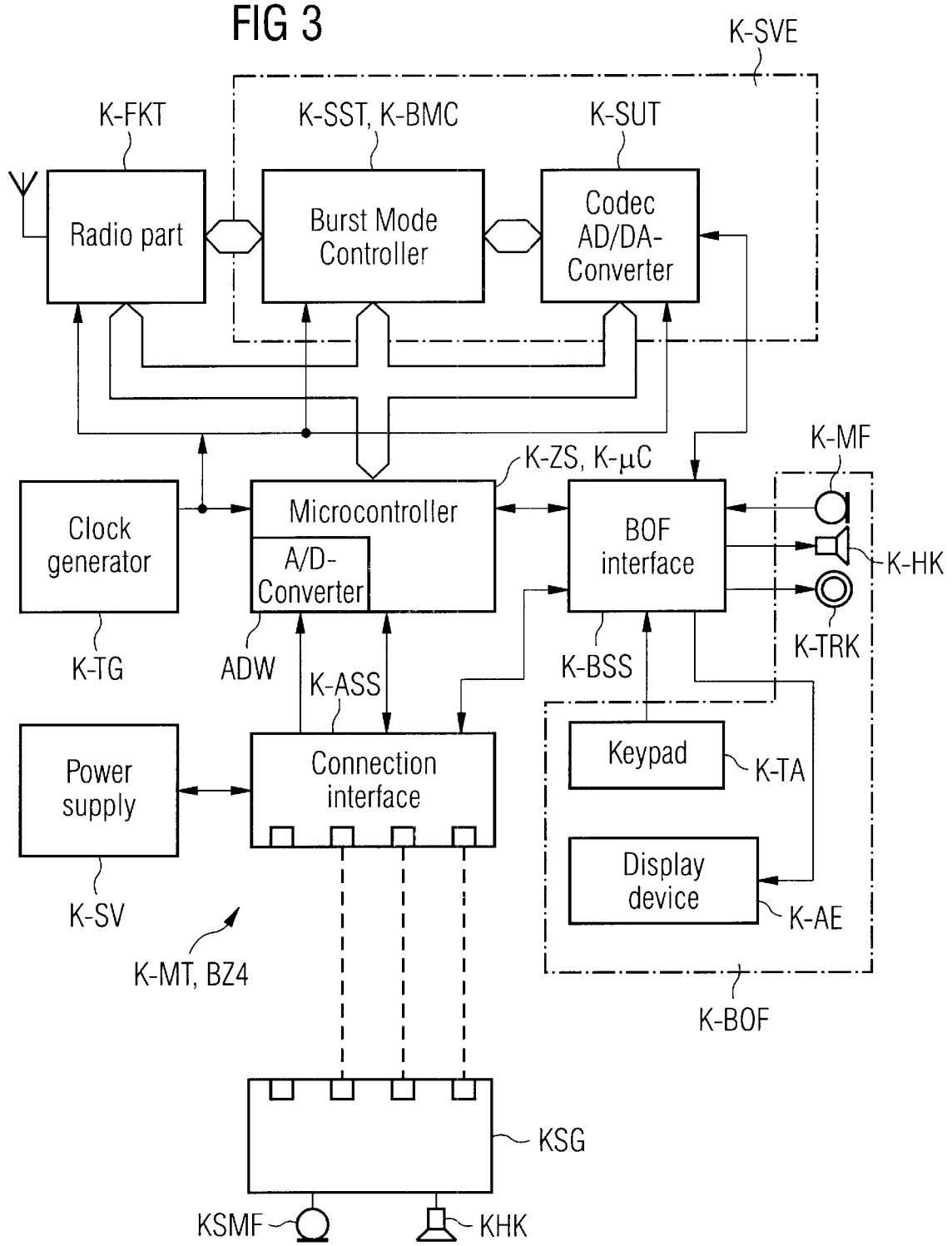
FIG. 3 shows a circuit diagram of a convenience mobile telecommunications system.

- a) connecting contact K-AK3 and the fourth connecting contact K-AK4 of the four convenience connecting contacts of the second connection interface K-ASS of the convenience mobile part K-MT according to-FIG. 4, and
- b) three headset contacts of the headset KSG according to FIG. 3, a first headset contact KK1, a second headset contact KK2 and a third headset contact KK3.

The first connecting contact K-AK1 remains unused for the connection between the convenience mobile part K-MT and the headset KSG. This means that the first switching element SE1, which is designed as a charging switch, is permanently closed in the third operating mode BZ3 (original mode of the switching element SE1).

Since the acknowledgement switch SE2 is closed in the original state, when the headset contacts KK1 . . . KK3 of the headset KSG are plugged onto the connection interface K-ASS by means of the connecting contacts K-AK2 . . . K-AK4, the headset KSG is automatically activated, together with the headset microphone KSMF and the earpiece/headset loudspeaker KHK/KLSP.

A check is now carried out once again via the analog/digital converter ADW in the central controller K-ZS to determine whether any microphone current MFS is flowing as a result of the headset microphone KSMF having been switched on.

If this is the case, then
- a) the microphone K-MF and the earpiece K-HK in the convenience mobile part K-MT are switched off by the central controller K-ZS, K-μC and
- b) the acknowledgement switch SE2 remains closed.

Otherwise,
- a) the microphone K-MF and the earpiece K-HK in the convenience mobile part K-MT remain switched on and
- b) the acknowledgement switch SE2 remains closed.

If any microphone current MFS is flowing, then the performance feature "hands-free speech" and "hands-free listening" is activated, and the analog voice signals can be transmitted bidirectionally between the headset microphone KSMF and the BOF interface K-BSS according to FIG. 3, as well as the BOF interface K-BSS and the earpiece KHK, via the headset contacts KK2, KK3 and the connecting contacts K-AK3, K-AK4.

The closed circuit for any microphone current MFS and for the analog voice signals is achieved by the common ground connection between the convenience mobile part K-MT and the headset KSG via the second connecting contact K-AK2 and the first headset contact KK1.

The above description, which relate to a convenience mobile part K-MT having the performance feature "hands-free speech" and "hands-free listening" can also be extended to convenience mobile parts K-MT having the performance feature "hands-free speech" and/or "hands-free listening", taking into account the performance-feature-specific changes.

A further, fourth operating mode BZ4 of the convenience mobile part K-MT according to FIG. 2 and FIG. 3 is handset operation, in which the convenience mobile part K-MT is operated without a convenience charging station K-LST, without a standard charging station S-LST and without a headset KSG. The connecting contacts K-AK1 . . . K-AK4 all remain unused in this case.

Figure 7:
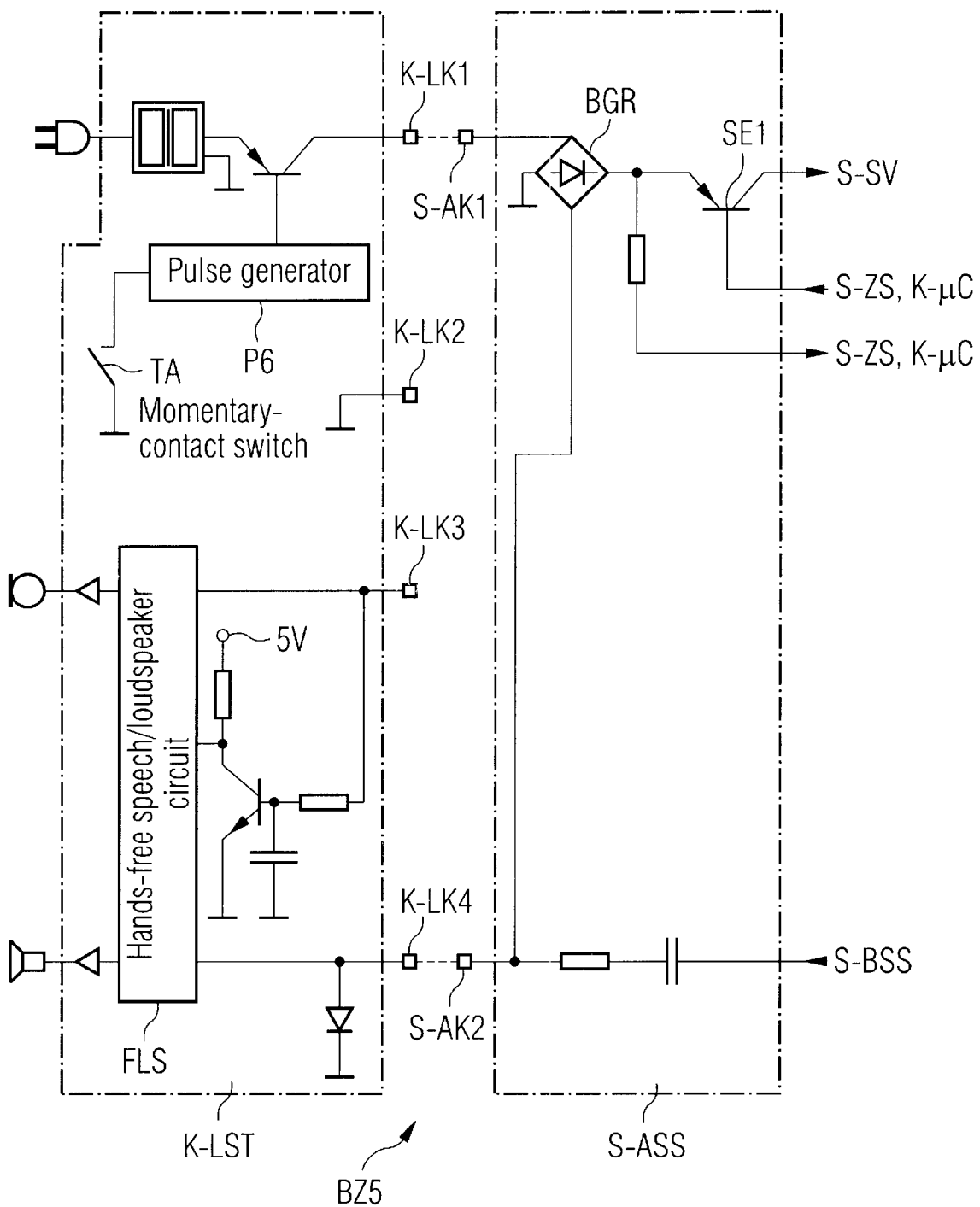
FIG. 7 shows a circuit diagram for the operation of a standard mobile part on a convenience charging station (fifth operating mode)

FIG. 7 shows a fifth operating mode BZ5 of the standard mobile part S-MT according to FIG. 1, in which the first connection interface S-ASS of the standard mobile part S-MT is connected to the convenience charging station K-LST according to FIG. 2. In the fifth operating mode BZ2, only the standard feature is supported, with the first connection interface S-ASS according to FIG. 1, by the standard mobile part S-MT which is designed for the standard feature "battery recharging", although the convenience charging station K-LST has the capability for "hands-free speech" and "loudspeaker".

The connection between the standard mobile part S-MT and the convenience charging station K-LST is in this case produced via a) the first charging station contact K-LK1 and the fourth charging station contact K-LK4 of the four charging station contacts of the convenience charging station K-LST according to FIG. 2, and b) two connecting contacts of the standard mobile part S-MT according to FIG. 1 (standard connecting contacts), a first standard connecting contact S-AK1 and a second standard connecting contact S-AK2.

The second charging station contact K-LK2 and the third charging station contact K-LK3 remain unused for the connection between the standard mobile part S-MT and the convenience charging station K-LST. This means that the hands-free speech/loudspeaker circuit FLS is inactive.

In order to recharge the rechargeable battery S-SV in the standard mobile part S-MT according to FIG. 1, the charging current LS is produced in the convenience charging station K-LST by the plug connection K-SA for the AC power supply (for example 220 V AC) and the power supply voltage transformer S-NST. In the first connection interface S-ASS of the standard mobile part S-MT, the charging current LS first of all flows through the bridge rectifier BGR, which is connected to the first connecting contact S-AK1. After this, the charging current LS passes via the closed charging switch SE1 to the rechargeable battery S-SV. A closed charging circuit is produced by the common ground connection between the standard mobile part S-MT and the convenience charging station K-LST, via the second connecting contact S-AK2 and the fourth charging station contact K-LK4. To this end, the bridge rectifier BGR is connected in the illustrated manner by a first output to the ground potential of the connection interface S-ASS and of the standard mobile part S-MT, and by a second output via the second connecting contact S-AK2, the fourth charging station contact S-LK4 and a diode D, to the ground potential of the convenience charging station K-LST.

Figure 8:
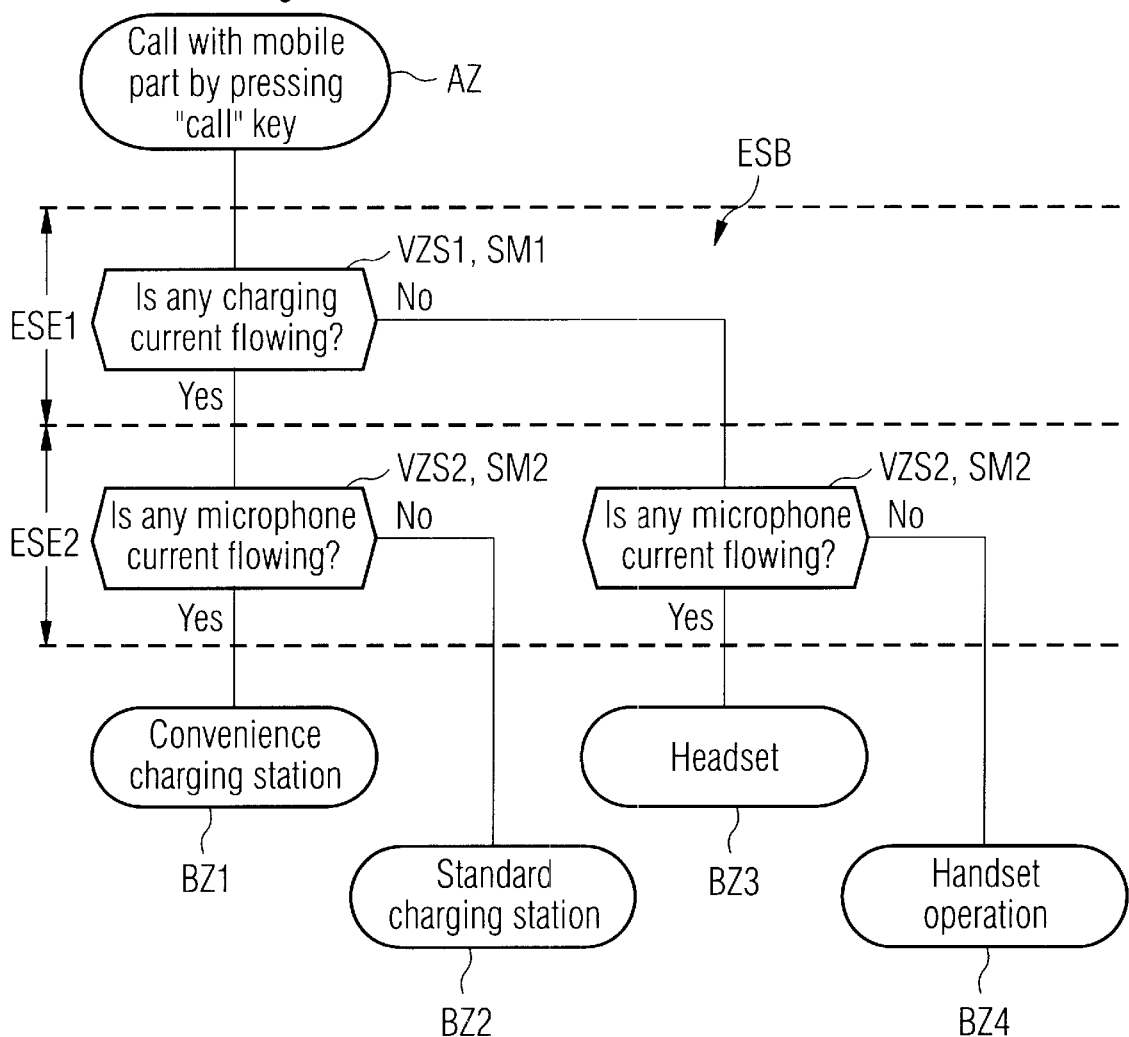
FIG. 8 shows a flow chart for assuming four possible operating modes (first to fourth operating modes) of the convenience mobile part from an original mode "Call with mobile part for example by pressing the 'call' key"
Figure 9:
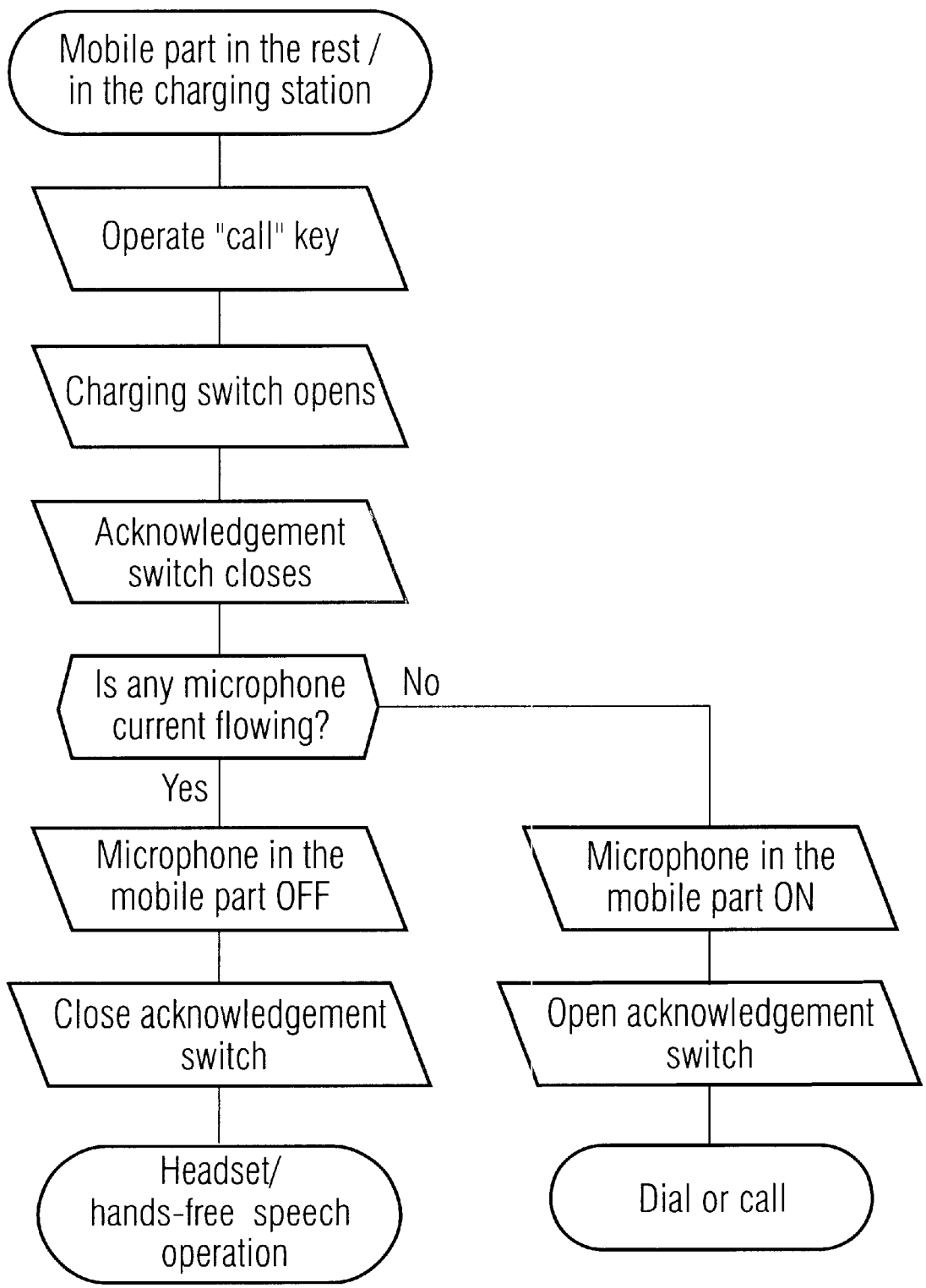
FIG. 9 shows a flow chart for various changes in the operating mode of the convenience mobile part.
Figure 10:
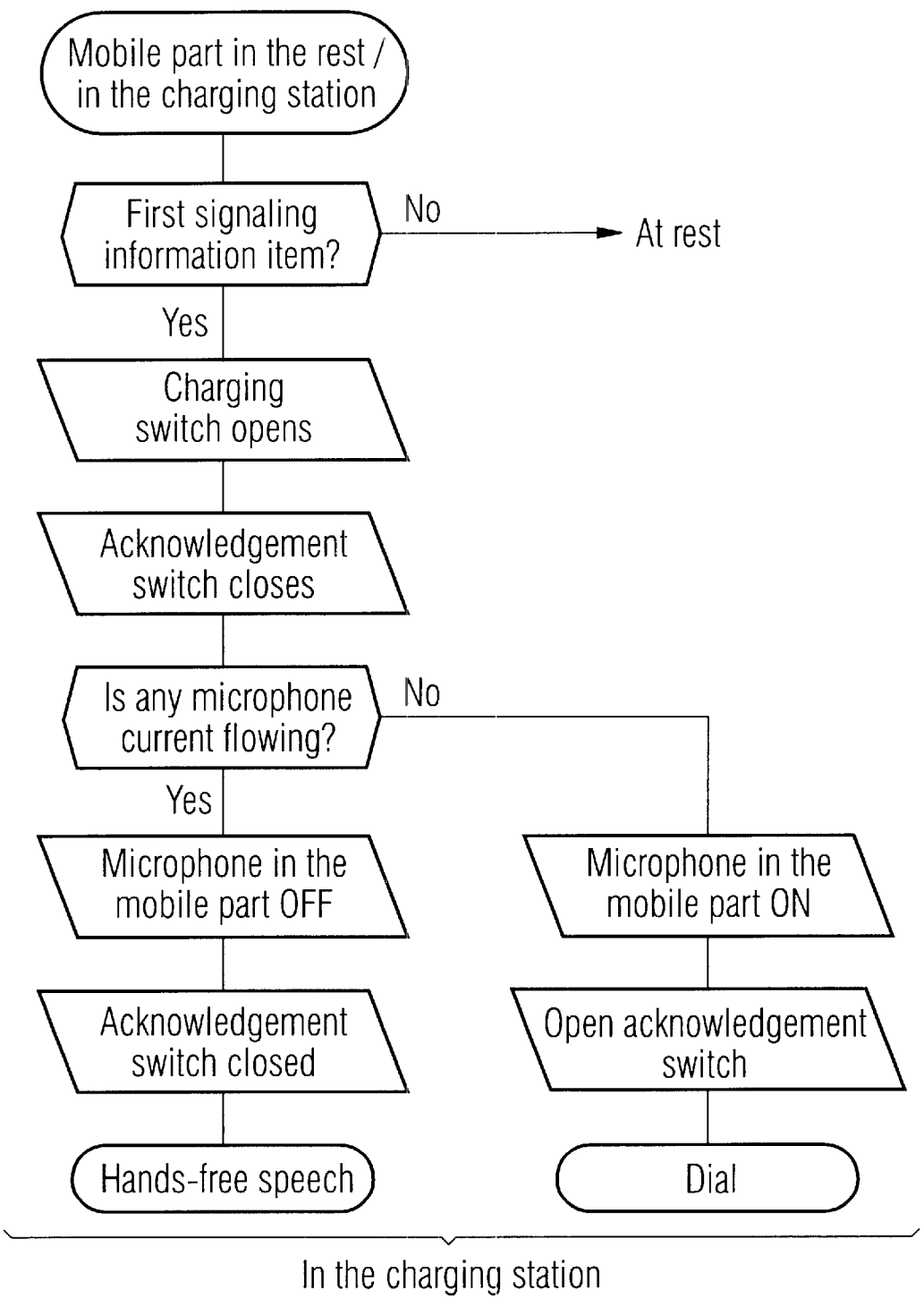
FIG. 10 shows a flow chart for an alternative embodiment of a convenience mobile telecommunication system.
Figure 11:
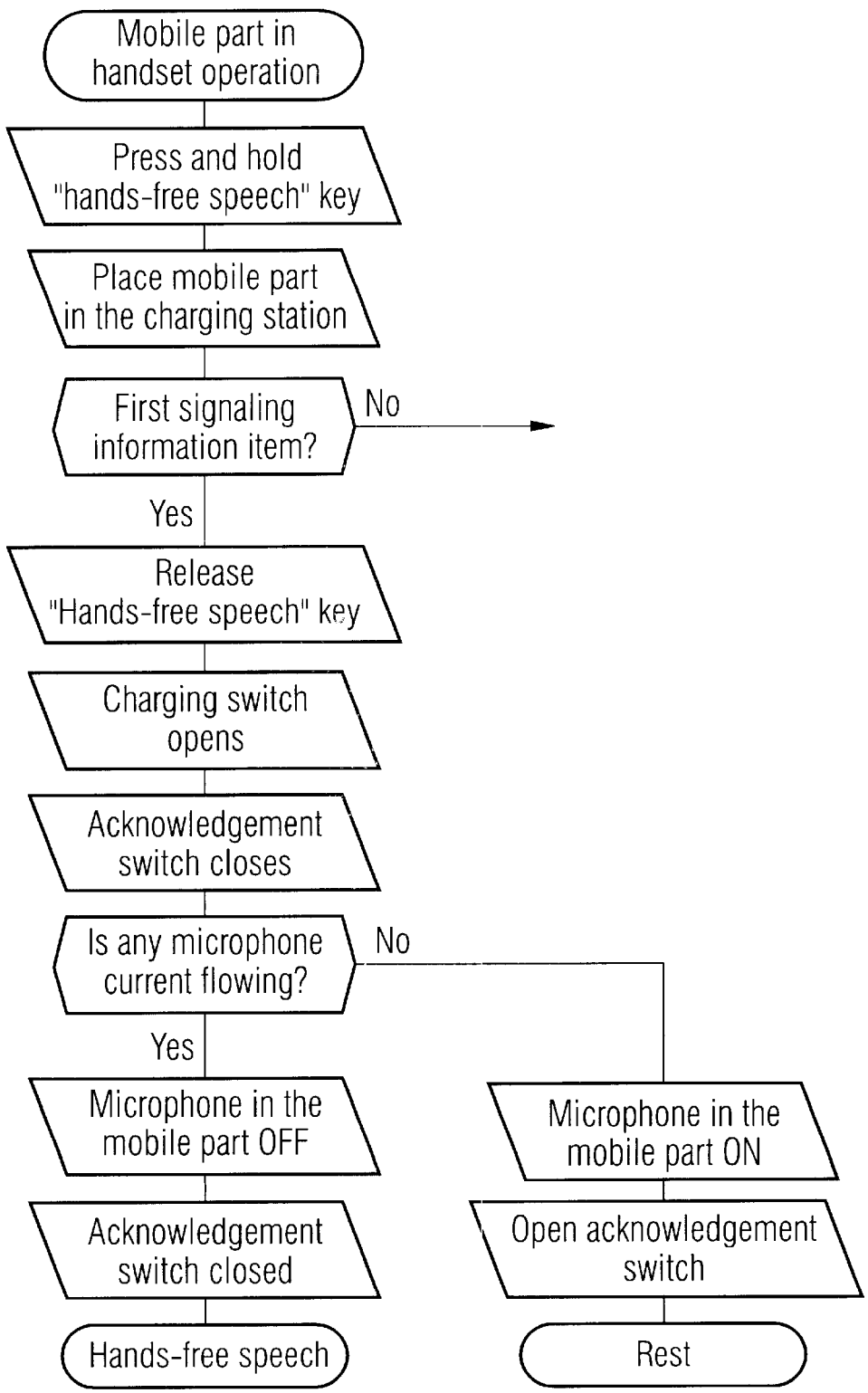
FIG. 11 shows a flow chart for an alternative embodiment of a convenience mobile telecommunication system.
Figure 12:
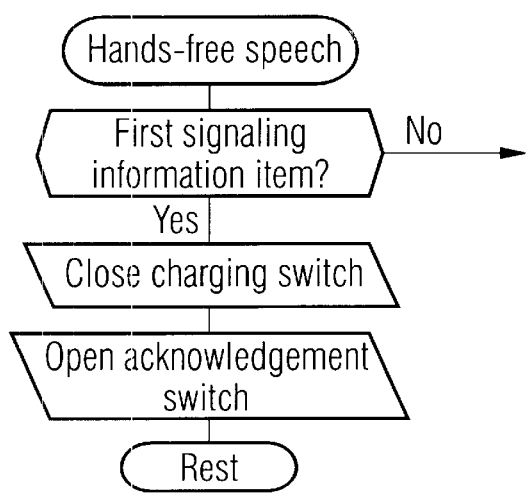
FIG. 12 shows a flow chart for an alternative embodiment of a convenience mobile telecommunication system.
Figure 13:
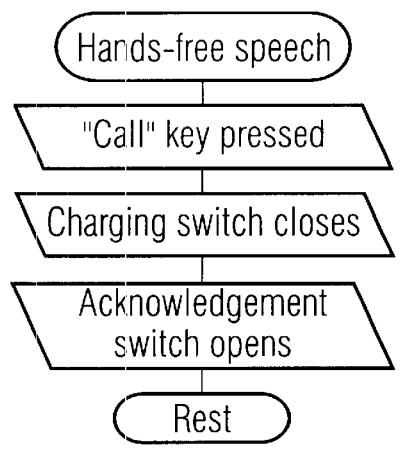
FIG. 13 shows a flow chart for an alternative embodiment of a convenience mobile telecommunication system.
Figure 14:
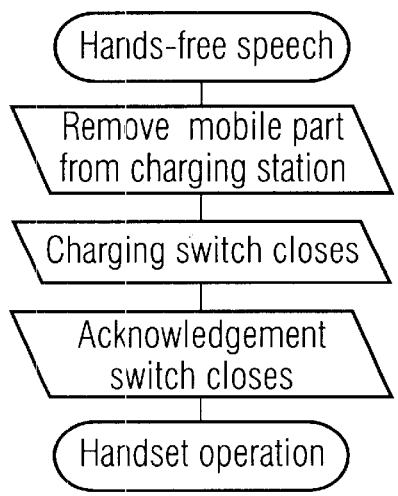
FIG. 14 shows a flow chart for an alternative embodiment of a convenience mobile telecommunication system.

FIG. 8 shows a flow chart illustrating how the convenience mobile part K-MT assumes the four operating modes BZ1 . . . BZ4 from an original mode AZ ("Call with the mobile part, for example by pressing the 'call' key"), which is implemented and runs in the central controller K-ZS of the convenience mobile part K-MT. The flow chart comprises a decision tree ESB having two decision levels, a first decision level ESE1 and a second decision level ESE2. In the first decision level ESE1, there is a first branch point VZS1, at which interrogation is carried out on the basis of a first selection feature SM1 ("is any charging current flowing?") for the operating modes BZ1 . . . BZ4.

In the second decision level ESE2, there are two second branch points VZS2, at which interrogation is in each case carried out on the basis of a second selection feature SM2 ("is any microphone current flowing?") for the operating modes BZ1 . . . BZ4.

FIG. 9 to FIG. 16 show flow charts for various changes in the operating mode of the convenience mobile part K-MT, which are implemented and run in the central controller K-ZS.

Although other modifications and changes may be suggested by those skilled in the art, it is the intention of the inventors to embody within the patent warranted hereon all changes and modifications as reasonably and properly come within the scope of their contribution to the art.

I claim:

1. A method for identifying a plurality of operating modes of an electrical apparatus, the method comprising the steps of:

establishing an original mode;

assuming a first number "n" of the plurality of operating modes where "n≧4" from the original mode;

defining a decision tree having a plurality of decision levels and a plurality of level immanent branch points, wherein for n operating modes, there are a second number "m" decision levels such that "$2^m \geq n \geq 2^{m-1}+1$"; and performing an interrogation, in sequential fashion from a first decision level to a last decision level of the plurality of decision levels; at each of the branch points on each of the plurality of decision levels on the basis of a same selection feature of the plurality of operating modes in accordance with the decision tree, wherein each respective result of the interrogation at the branch points on the last decision level directly results in the identification of a respective one of the plurality of operating modes.

2. The method as claimed in claim 1, further comprising the step of:

operating the electrical apparatus in a first operating mode for operating on a convenience charging station, a second operating mode for operating on a standard charging station, a third operating mode for operating on a headset or a fourth operating mode for operating as a handset.

3. The method as claimed in claim 1, wherein the step of performing an interrogation further comprises the steps of:

detecting a first selection feature for the flow of charging current; and detecting a second selection feature for the flow of microphone current.

4. An electrical apparatus having an original mode and assuming a number "n" of a plurality of operating modes wherein "n≧4" from the original mode, the apparatus comprising:

means for detecting selection features for the plurality of operating modes; and means for controlling apparatus-specific functional sequences connected to the means for detecting selection features, where the apparatus-specific functional sequences are designed in such a manner that an interrogation is performed, in sequential fashion from a first decision level to a last decision level of a plurality of decision levels, at all level-immanent branch points on each of the plurality of decision levels of a decision tree on the basis of a same selection feature wherein for n operating modes, there are a second number "m" decision levels such that "$2^m \geq n \geq 2^{m-1}+1$", wherein each respective result of the interrogation at the branch points on the last decision level directly results in the identification of the respective one of the plurality of operating modes.

5. The electrical apparatus as claimed in claim 4, wherein the electrical apparatus is a cordless mobile part.

6. The electrical apparatus as claimed in claim 5, wherein the cordless mobile part has a first operating mode for operating on a convenience charging station, a second operating mode for operating on a standard charging station, a third operating mode for operating on a headset and a fourth operating mode for operating as a handset.

7. The electrical apparatus as claimed in claim 6, wherein the means for detecting detects the flow of charging current and the flow of microphone current.

8. The electrical apparatus as claimed in claim 6 further comprising: four connecting contacts in the means for detecting by which the electrical apparatus (K-MT) can be connected to a convenience charging station, a standard charging station or a headset.

* * * * *